March 21, 1933.   W. L. R. EMMET   1,902,494
CYLINDER HEAD FASTENING MEANS
Original Filed Sept. 17, 1928
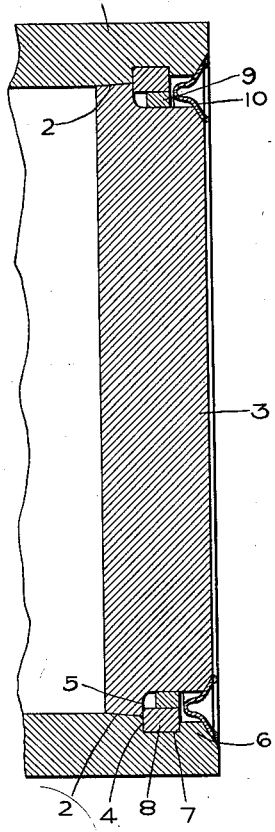
Inventor:
William L. R. Emmet,
by Charles E. Mullan
    His Attorney.

Patented Mar. 21, 1933

1,902,494

UNITED STATES PATENT OFFICE

WILLIAM L. R. EMMET, OF SCHENECTADY, NEW YORK, ASSIGNOR TO GENERAL ELECTRIC COMPANY, A CORPORATION OF NEW YORK

CYLINDER HEAD FASTENING MEANS

Original application filed September 17, 1928, Serial No. 306,486. Divided and this application filed October 22, 1929. Serial No. 401,564.

This application is a division of the application of William L. R. Emmet and Bevis P. Coulson, Jr., Serial No. 306,486, filed September 17, 1928.

The invention relates to cylinder head fastening means, and has for its object to provide an improved construction and arrangement of fastening means which, while holding the head firmly and tightly in the cylinder, at the same time is removable so that access may be obtained readily to the interior of the cylinder.

The invention is well adapted for sealing in place the head of the cylinder or drum of a vapor boiler, such as a mercury boiler, although it is not limited to this use. When used for this purpose, the invention possesses special utility because here it is important that the head, while being removable, shall at the same time be vapor-tight under all conditions of operation.

For a consideration of what I believe to be novel and my invention, attention is directed to the following specification and the claims appended thereto.

In the drawing, the figure is a sectional view of a construction embodying my invention.

Referring to the drawing, 1 indicates an end of a drum which is to be sealed by means of a removable head. The end of the drum is provided with a slightly tapered seat 2, with which engages a correspondingly tapered seat on a head 3. Outside seat 2 the drum and head are cut away to provide shoulders 4 and 5 respectively. Beyond shoulder 4, drum 1 is provided with an inwardly projecting lip 6, thereby providing an annular inwardly facing groove 7 in drum 1. Located in groove or recess 7 is a holding ring 8. This may be a single continuous ring which is split transversely to permit of its being inserted in groove 7, or it may be made up of two or more sections or keys so as to enable it to be inserted in the groove. Holding ring 8 is fastened in groove 7 by a locking ring 9 located between ring 8 and the adjacent surface of head 3. Ring 8 overlaps or engages the outer surface 5 on head 3 so as to hold the head in position in the drum.

To render the joint fluid-tight, the space between the drum and the head is sealed by means of an annular ring 10 U-shaped in cross section, which may be formed of relatively thin material and which at its two edges is welded to drum 1 and head 3. Since ring 10 is U-shaped in cross section, it is capable of yielding in a radial direction in case of expansion and contraction of the drum 1 and head 3 relatively to each other. At the same time, being U-shaped in cross section and arranged as shown, it is capable of withstanding outwardly applied pressure. It serves to seal the joint against leakage, even though the engaging surfaces between drum 1 and head 3 do not remain absolutely leakproof. With this construction, the rings 8 and 9 serve as a means for mechanically connecting the head to the drum and carry the load due to the pressure within the drum, while the U-shaped annular ring 10 forms a sealing means which is not required to carry any of the load due to pressure in the drum. By my invention, therefore, I provide a fastening and sealing means for the head of a cylinder which is capable of withstanding substantial pressure and which will remain tight even though some relative expansion of the parts occurs. At the same time, the head is readily removable, it being only necessary to remove first the sealing ring 10 and the locking ring 9, and then the holding ring 8.

What I claim as new and desire to secure by Letters Patent of the United States is:

1. The combination of a cylinder having an open end and an inwardly facing groove near the end, a head in the open end, a split ring located in the groove for fastening the head to the cylinder, and a radially yielding ring having its outer and inner edges fastened to the cylinder and head respectively and covering the joint between them to render the cylinder and head fluid-tight.

2. The combination of a cylinder having an open end, a seat and an inwardly facing annular groove at such end, a head engaging the seat, a ring comprising a plurality of segments located in said groove for mechanically holding the head in position, and a radially yieldable ring having its outer and inner edges fastened to the cylinder and head respectively and covering the joint between them for rendering the cylinder and head fluid-tight.

3. The combination of a drum having an open end and an inwardly facing annular groove at such end, a head in said open end, said head being provided with a recess which provides a shoulder, a ring in the groove which engages the shoulder for mechanically holding the head in position, a locking ring for said first named ring, and a radially yieldable ring having its outer and inner edges fastened to the cylinder and head respectively and covering the joint between them to render the cylinder and head fluid-tight.

4. A drum comprising an integrally formed body with an opening, a plate for said opening, means for mechanically securing said plate to said body and a ring covering the joint between the body and plate and being integrally united therewith at opposite sides of the joint, said ring being yieldable in a radial direction to permit relative expansion between the drum and the plate.

5. A drum comprising an integrally formed body with an opening, a head in said opening, means for mechanically securing the head in the opening of said body and a corrugated metal strip covering the joint between said body and head, the outer and inner edges of said strip being welded to said body and head respectively.

In witness whereof I have hereunto set my hand this 19th day of October, 1929.

WILLIAM L. R. EMMET.